US012792962B2

(12) United States Patent
Juarez et al.

(10) Patent No.: US 12,792,962 B2
(45) Date of Patent: Nov. 10, 2026

(54) LOCAL DIFFERENTIALLY PRIVATE MECHANISMS TO MEASURE PERFORMANCE DEMOGRAPHIC DISPARITIES IN FEDERATED LEARNING

(71) Applicant: University of Southern California, Los Angeles, CA (US)

(72) Inventors: Marc Juarez, Los Angeles, CA (US); Aleksandra Korolova, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 766 days.

(21) Appl. No.: 18/322,525

(22) Filed: May 23, 2023

(65) Prior Publication Data

US 2023/0376854 A1 Nov. 23, 2023

Related U.S. Application Data

(60) Provisional application No. 63/346,785, filed on May 27, 2022, provisional application No. 63/344,946, filed on May 23, 2022.

(51) Int. Cl.
*G06N 20/00* (2019.01)

(52) U.S. Cl.
CPC .................................... *G06N 20/00* (2019.01)

(58) Field of Classification Search
CPC ............................ G06N 20/00; G06F 21/6254
See application file for complete search history.

(56) References Cited

U.S. PATENT DOCUMENTS

| | | | | |
|---|---|---|---|---|
| 2017/0316346 | A1 | 11/2017 | Park et al. | |
| 2019/0147188 | A1 | 5/2019 | Benaloh et al. | |
| 2019/0236306 | A1 | 8/2019 | Ding et al. | |
| 2020/0311300 | A1* | 10/2020 | Callcut | G06F 21/6245 |
| 2020/0394320 | A1* | 12/2020 | Bernau | G06N 3/08 |
| 2020/0401946 | A1 | 12/2020 | Bonawitz et al. | |
| 2021/0374605 | A1* | 12/2021 | Qian | G06N 20/00 |

(Continued)

FOREIGN PATENT DOCUMENTS

| | | | |
|---|---|---|---|
| CN | 113614726 | A | 11/2021 |
| WO | 2021204040 | A1 | 10/2021 |
| WO | 2023149880 | A1 | 8/2023 |

OTHER PUBLICATIONS

Zhang et al., "Local Differential Privacy Based Membership-Privacy-Preserving Federated Learning for Deep-Learning-Driven Remote Sensing," Oct. 20, 2023, https://www.mdpi.com/2072-4292/15/20/5050.*

(Continued)

*Primary Examiner* — Ryan Barrett

(74) *Attorney, Agent, or Firm* — Pillsbury Winthrop Shaw Pittman LLP

(57) ABSTRACT

Provided is a method for determining a performance gap of a model for users of different groups, comprising: obtaining, with a computer system, group membership values and data values of a user; applying, with the computer system, a first perturbation to a group membership values of the user; applying, with the computer system, a second perturbation to perturb data values of the user based on the applied first perturbation; and outputting, with the computer system, perturbed data values and perturbed group membership values of the user.

24 Claims, 6 Drawing Sheets

(56) References Cited

U.S. PATENT DOCUMENTS

| | | | | |
|---|---|---|---|---|
| 2021/0383280 | A1* | 12/2021 | Shaloudegi | G06F 17/18 |
| 2021/0390188 | A1* | 12/2021 | Mireshghallah | G06F 18/15 |
| 2023/0076024 | A1* | 3/2023 | Baek | H04L 9/0894 |

OTHER PUBLICATIONS

Bajorek, Joan Palmiter, "Voice Recognition Still Has Significant Race and Gender Biases", May 10, 2019, pp. 1-6, Harvard Business Review.

Harwell, Drew, "How Amazon's and Google's smart speakers leave certain voices behind", Jul. 19, 2018, pp. 1-11, The Washington Post.

Dubois, Daniel J. et al., "When Speakers Are All Ears: Characterizing Misactivations of IoT Smart Speakers", Proceedings on Privacy Enhancing Technologies, Oct. 1, 2020, vol. 2020, Issue 4, pp. 255-276, The National Science Foundation, Alexandria, VA.

"HomePod arrives Feb. 9, available to order this Friday", Press Release, Jan. 23, 2018, pp. 1-7, Apple Newsroom, available at <https://www.apple.com/newsroom/2018/01/homepod-arrives-february-9-available-to-order-this-friday/>.

"Gboard—the Google Keyboard", updated Jul. 31, 2023, pp. 1-5, Google LLC, available at <https://play.google.com/store/apps/details?id=com.google.android.inputmethod.latin>.

Bohn, Dieter, "Amazon says 100 million Alexa devices have been sold—what's next?", Jan. 4, 2019, pp. 1-14, The Verge, available at <https://www.theverge.com/2019/1/4/18168565/amazon-alexa-devices-how-many-sold-number-100-million-dave-limp>.

Alao, Rachad, et al. "How Meta is working to assess fairness in relation to race in the US across its products and systems", Meta Technical Report, 2021, pp. 1-34.

Asi, Hilal, et al., "Optimal algorithms for mean estimation under local differential privacy", 2022, pp. 1046-0156, vol. 162, Proceedings of the 39th International Conference on Machine Learning.

Austin Jr., Roy L., "Race Data Measurement and Meta's Commitment to Fair and Inclusive Products", updated Jul. 28, 2022, pp. 1-7, Meta, available at <https://about.fb.com/news/2021/11/inclusive-products-through-race-data-measurement/>.

Bogen, Miranda, et al., "Awareness in practice: tensions in access to sensitive attribute data for antidiscrimination", 2020, pp. 492-500, Proceedings of the 2020 conference on fairness, accountability, and transparency.

Bonawitz, Keith, et al., "Practical Secure Aggregation for Privacy-Preserving Machine Learning", Oct. 2017, pp. 1175-1191, Proceedings of the 2017 ACM SIGSAC Conference on Computer and Communications Security.

Brown, Gavin, et al., "Covariance-Aware Private Mean Estimation Without Private Covariance Estimation", Advances in Neural Information Processing Systems, Jul. 23, 2021, pp. 1-44.

Buolamwini, Joy et al., "Gender shades: Intersectional accuracy disparities in commercial gender classification", 2018, pp. 1-15, Conference on fairness, accountability and transparency, Proceedings of Machine Learning Research, vol. 81.

Celi, Leo Anthony, et al., "Sources of bias in artificial intelligence that perpetuate healthcare disparities—A global review", Mar. 31, 2022, pp. 1-12, PLOS Digital Health, 1(3), e0000022, available at <https://doi.org/10.1371/journal.pdig.0000022>.

"The Trouble with Bias—NIPS 2017 Keynote—Kate Crawford", Youtube, uploaded by The Artificial Intelligence Channel, dated Dec. 10, 2017, available at <https://www.youtube.com/watch?v=fMym_BKWQzk>.

Granqvist, Filip et al., "Improving on-device speaker verification using federated learning with privacy", Aug. 6, 2020, Proceedings of the INTERSPEECH conference, pp. 4328-4332, available at <https://arxiv.org/pdf/2008.02651.pdf>.

Gu, Xiaolan, et al., "PCKV: Locally Differentially Private Correlated Key-Value Data Collection with Optimized Utility", 2020, pp. 967-984, 29th USENIX security symposium (USENIX security 20).

Hard, Andrew, et al., "Federated learning for mobile keyboard prediction", revised Feb. 28, 2019, pp. 1-7, arXiv preprint arXiv:1811.03604.

Hosseini, Hossein, et al., "Federated learning of user authentication models", Jul. 9, 2020, pp. 1-10, arXiv preprint arXiv:2007.04618.

Jagielski, Matthew, et al., "Differentially private fair learning", May 31, 2019, pp. 1-31, Proceedings of the 36th International Conference on Machine Learning, vol. 97 of Proceedings of Machine Learning Research, PMLR.

Juarez, Marc, et al., ""You Can't Fix What You Can't Measure": Privately Measuring Demographic Performance Disparities in Federated Learning", Jan. 11, 2023, pp. 1-19, Proceedings of the Workshop on Algorithmic Fairness through the Lens of Causality and Privacy, vol. 214 of Proceedings of Machine Learning Research, PMLR 214:67-85.

Kilbertus, Niki, et al., "Blind justice: Fairness with encrypted sensitive attributes", Jun. 8, 2018, pp. 1-15, Proceedings of the 35th International Conference on Machine Learning, vol. 80 of Proceedings of Machine Learning Research, PMLR 80:2630-2639.

McMahan, Brendan, et al., "Federated Learning: Collaborative Machine Learning without Centralized Training Data", Apr. 6, 2017, pp. 1-5, Google AI Blog, available at <https://ai.googleblog.com/2017/04/federated-learning-collaborative.html>.

McSherry, Frank D., "Privacy integrated queries: an extensible platform for privacy-preserving data analysis", Jun. 29, 2009, pp. 19-30, Proceedings of the 2009 ACM SIGMOD International Conference on Management of data.

Mehrabi, Ninareh, et al., "A survey on bias and fairness in machine learning", Jul. 13, 2021, pp. 1-35, ACM Computing Surveys, vol. 54, Issue 6.

Nguyên, Thông T., et al., "Collecting and Analyzing Data from Smart Device Users with Local Differential Privacy", Jun. 16, 2016, pp. 1-11, arXiv preprint arXiv:1606.05053.

Sap, Maarten, et al., "The risk of racial bias in hate speech detection", Jul. 2019, pp. 1668-1678, Proceedings of the 57th Annual Meeting of the Association for Computational Linguistics, Florence, Italy.

Shinmoto Torres, Roberto Luis, et al., "Effectiveness of a batteryless and wireless wearable sensor system for identifying bed and chair exits in healthy older people", Apr. 15, 2016, pp. 1-24, Sensors, vol. 16, Issue 4.

Veale, Michael, et al., "Fairer machine learning in the real world: Mitigating discrimination without collecting sensitive data", Nov. 20, 2017, pp. 1-23, Big Data & Society, vol. 4, Issue 2.

Wang, Tianhao, et al., "Locally differentially private protocols for frequency estimation", Aug. 2017, pp. 729-745, Proceedings of the 26th USENIX Security Symposium (USENIX Security 17).

Xu, Xiaohang, et al., "Privacy-preserving federated depression detection from multi-source mobile health data", Mar. 7, 2021, pp. 4788-4797, IEEE Transactions on Industrial Informatics, vol. 18, Issue 7.

Xu, Xiaohang, et al., "Fedmood: Federated learning on mobile health data for mood detection", May 20, 2021, pp. 1-9, arXiv preprint arXiv:2102.09342.

Yang, Timothy, et al., "Applied federated learning: Improving google keyboard query suggestions", Dec. 7, 2018, pp. 1-9, arXiv preprint arXiv:1812.02903.

Ye, Qingqing, et al., "PrivKV: Key-value data collection with local differential privacy", May 19, 2019, pp. 317-331, 2019 IEEE Symposium on Security and Privacy (SP).

Yuan, Binhang, et al., "A Federated Learning Framework for Healthcare IoT devices", May 7, 2020, pp. 1-3, arXiv preprint arXiv:2005.05083.

Rodríguez-gálvez, Borja, et al., "Enforcing fairness in private federated learning via the modified method of differential multipliers", Apr. 15, 2022, pp. 1-20, arXiv preprint arXiv:2109.08604.

Li, Tian, et al., "Ditto: Fair and Robust Federated Learning Through Personalization", 2021, pp. 6357-6368, Proceedings of the 38th International Conference on Machine Learning, vol. 139 of Proceedings of Machine Learning Research, PMLR.

(56) References Cited

OTHER PUBLICATIONS

Padala, Manisha, et al., “Federated Learning Meets Fairness and Differential Privacy”, Aug. 23, 2021, pp. 1-12, Neural Information Processing, ICONIP 2021, Communications in Computer and Information Science, vol. 1517.
Gu, Xiuting, et al., “The Impact of Differential Privacy on Model Fairness in Federated Learning”, pp. 419-430, Network and System Security: 14th International Conference, NSS 2020, Melbourne, VIC, Australia, Nov. 25-27, 2020, Proceedings 14.
Abay, Annie, et al., “Mitigating Bias in Federated Learning”, Dec. 4, 2020, pp. 1-16, arXiv preprint arXiv:2012.02447.
Vitaladevuni, Shiv, “Keynote Session 3: Federated Learning Applications in Alexa”, Jul. 18, 2020, International Workshop on Federated Learning for User Privacy and Data Confidentiality, available at <https://federated-learning.org/fl-icml-2020/#k3>.

* cited by examiner

LOCAL DIFFERENTIALLY PRIVATE MECHANISMS TO MEASURE PERFORMANCE DEMOGRAPHIC DISPARITIES IN FEDERATED LEARNING

CROSS-REFERENCE TO RELATED APPLICATIONS

This application claims the benefit of U.S. Provisional Application 63/344,946, titled "LOCALLY DIFFERENTIALLY PRIVATE MECHANISMS TO MEASURE PERFORMANCE DEMOGRAPHIC DISPARITIES IN FEDERATED LEARNING", filed 23 May 2022, and U.S. Provisional Application 63/346,785, titled "LOCAL DIFFERENTIALLY PRIVATE MECHANISMS TO MEASURE PERFORMANCE DEMOGRAPHIC DISPARITIES IN FEDERATED LEARNING," filed 27 May 2022. The entire contents of each afore-mentioned patent filing is hereby incorporated by reference.

GOVERNMENT LICENSE RIGHTS

Government License Rights: This invention was made with government support under grants 1943584, 1916153, and 1956435 awarded by the National Science Foundation (NSF). The government has certain rights in the invention.

BACKGROUND

The present disclosure relates generally to federated learning in the context of machine learning.

Federated learning, in some use cases, allows many devices to collaborate in training of machine learning models. As in other forms of machine learning, there is a growing concern that models trained with federated learning may exhibit disparate performance for different demographic groups. Existing solutions to measure and ensure equal model performance across groups typically require access to information about group membership, but this access is not always available or desirable, especially under the privacy aspirations motivating some uses of federated learning.

Protecting both user group membership and the federated model's local performance is helpful for privacy, because they may be correlated, and thus learning one may reveal the other. On the other hand, from the utility perspective, the privacy-preserved data should maintain the correlation to ensure ability to perform accurate measurements of the performance disparity. None of which is to suggest that any technique suffering to some degree from these issues is disclaimed or that any other subject matter is disclaimed.

SUMMARY

The following is a non-exhaustive listing of some aspects of the present techniques. These and other aspects are described in the following disclosure.

Some aspects include measurement of performance disparities for federated models, including performance disparities between members of various groups, which may be attributable at least in part to user group membership.

Some aspects include measurement of federated model performance, such as based on user data.

Some aspects include measurement of federated model performance based on a user's group membership, including when protecting privacy of a user's group membership. Some aspects include measurement of federated model performance while protecting the privacy of at least some of the federated learning users' data, which may include group membership.

Some aspects include measurement of federated model performance based on a relationship between a user's group membership and model performance. Some aspects include measurement of federated model performance while protecting a user's group membership.

Some aspects include determination of a performance gap, including when privacy protections are in place.

Some aspects include a locally differentially private mechanism, which may preserve a correlation between group membership and model performance. In some embodiments, a locally differentially private mechanism may preserve a model output or expectation value of a model output while applying privacy to a user's group membership. In some embodiments, the mechanism is an algorithm. In some embodiments the mechanism is operable on a client's and user's device. In some embodiments, the mechanism operates based on a privacy budget. In some embodiments, the mechanism may operate on multiple privacy budgets. In some embodiments, the mechanism adds noise to a user's data or group membership. In some embodiments, the mechanism discretizes a user's data or group membership. In some embodiments, perturbed data, which may be anonymized data, is generated from user data. In some embodiments, perturbed tuples, which may be a combination of user group identification and user data, are provided to the federated learning model.

Some aspects include estimation of a group average (e.g., expectation) of perturbed values. Some aspects include estimation of a group average of perturbed values for a given group membership. Some aspects include maintenance of a group average through a perturbation, where a group average of a perturbed value may be substantially equal to a group average of the value before perturbation. In some embodiments, group averages may be preserved between data and perturbed data. In some embodiments, the amount of perturbation may depend on the number or relative number of users in a group. In some embodiments, the amount of perturbation may depend on a privacy budget. Some aspects include discretized perturbations. Some aspects include additive perturbations, including noise distribution perturbations. In some embodiments, dispersion of user values may be preserved between data and perturbed data.

Some aspects include optimizing, for a given privacy budget, the amount of perturbation applied to perturb data. Some aspects include multiple privacy budgets, including partition of a privacy budget. Some aspects include determining a measure of information that may be gained by an adversary from perturbed data.

Some aspects include estimating a model disparity. Some aspects include bounding an error in estimating a disparity, including bounding an error in the disparity itself. Some aspects include optimizing an error in estimating disparity. Some aspects include optimizing, for a given privacy budget, an error in estimating disparity.

Some aspects include a locally differentially private mechanism based on randomized response. Some aspects include a locally differentially private mechanism based on generalized randomized response. Some aspects include a locally differentially private mechanism based on a Laplace response. In some embodiments, the mechanism is applied to cross-device federated learning. In some embodiments, the mechanism is applied to cross-silo federated learning.

Some aspects include an unbiased estimator of model performance.

Some aspects include a measure of fairness.

Some aspects include allocation of a privacy budget.

Some aspects include application of a locally differentially private mechanism to an unbalanced group.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
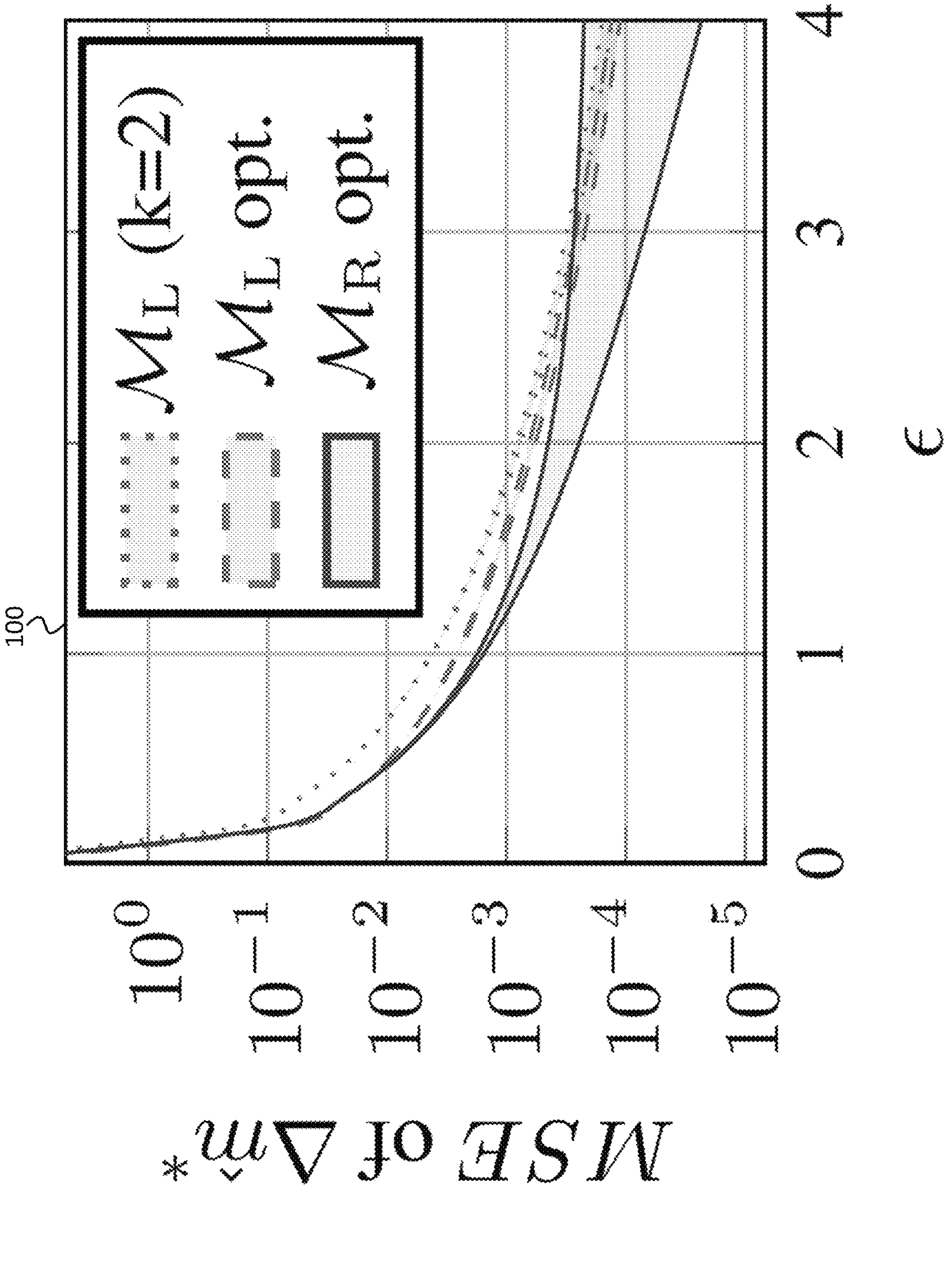
FIG. 1 is a graph of the mean squared error (MSE) of the performance gap of two groups of the same size, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As in traditional machine learning models, models trained with federated learning may exhibit disparate performance across demographic groups. Model holders may identify these disparities in order to mitigate undue harm to the groups. However, measuring a model's performance in a group may require access to information about group membership which, for privacy reasons, often has limited availability. In some embodiments, locally differentially private mechanisms may be used to measure differences in performance across groups while protecting the privacy of group membership. To analyze the effectiveness of the mechanisms, the error may be bound while estimating a disparity when a given mechanism is optimized for a given privacy budget. In some embodiments, that error may rapidly decrease for realistic numbers of participating clients, demonstrating that protecting privacy is not necessarily in conflict with identifying performance disparities of federated models.

Federated learning (FL) may be used to distribute the training of machine learning models across multiple organizations and multiple devices. Even though most of the academic literature in FL has focused on deployments across multiple organizations, also known as cross-silo federated learning (SFL), there are several largescale deployments of cross-device federated learning (DFL) in the industry. Cross-device federated learning (DFL) has become a popular way to distribute the training of machine learning (ML) models across multiple devices. Currently, there are several large-scale deployments of DFL in the industry, such as Android GBoard's next-word prediction, and Siri's speaker identification. A motivation for these deployments is the aspiration of training powerful models while ensuring privacy and data minimization. A motivation for DFL is the aspiration of training powerful machine learning models while ensuring, or at least partially providing, data minimization and privacy of the individuals involved. In some embodiments, mechanisms are applied to SFL, DFL, and other methods of FL.

However, ML models have been shown to exhibit disparate performance across groups, often falling short for people from marginalized groups, in the domains of vision, natural language processing, and healthcare; and, more recently, these performance disparities have also been observed in DFL. The challenge of disparate performance and, therefore, disparate impact, is relevant also for models trained with federated learning.

Performance disparities may be harmful beyond merely the individual's experience of worse quality of service. For example, a greater false positive rate of Alexa's wake-word detection on a group may lead to over-surveillance of that group, as a false activation may record unrelated speech and send it to the cloud for further processing. Some non-federated speech recognition models may perform worse when interpreting voices of women and people of non-white ethnicities. When, for example, a wake-word is incorrectly detected, samples of unrelated speech may be sent to a server for speech recognition. In some current implementations, mistaken activations may result in up to a minute of speech recording being uploaded to the cloud. Thus, apart from worse user experience, members of these groups may be subject to more surveillance. In another example, by default a browser may preemptively resolve the domain name for the URL bar autocompletes. When used in conjunction with a DFL system, groups that have worse ranking recommendations resolve irrelevant domain names, and thus may unnecessarily be more exposed to network adversaries. Further, in applications of DFL to the security domain, such as authentication, a performance disparity may lead to a lower security level for certain groups.

Overall, DFL has enormous traction in industry and academia and, if it were to become a de-facto data minimization or privacy standard for much of ML, as current trends suggest, an unknown performance disparity dependent on a demographic group may have tremendous negative consequences in many application domains. None of which is to suggest that any technique suffering to some degree from these issues is disclaimed or that any other subject matter is disclaimed.

One challenge in detecting and mitigating disparate performance of a DFL model is that access to information about the attributes related to group membership is often limited or noisy. Regulations, such as the GDPR in the EU, may mandate that protected attributes, such as gender or race, be collected only under appropriate privacy protections and explicit informed consent. In addition, without adequate privacy protection, volunteers who are members of stigmatized groups may be more likely to provide a false group membership, which can add noise to the collected attributes.

Some ML approaches attempt to reconcile the goals of protecting the privacy of group membership and mitigation of performance disparity by engaging a third-party in the collection of the protected attributes, use of secure multi-party computation, and ensuring differential privacy of the attributes. In some instances, disparity may be mitigated on a model that is used to make decisions about individuals (e.g., a model which receives data from multiple individuals), whereas DFL models may be distributed to clients for use on their own data (e.g., may make decisions based on data from a user on the user's own device). Credit score prediction models are an example of the former, and wake-word detection models, an example of the latter. Due to this distinction, the fairness definitions used by previously employed techniques may not be relevant for these DFL applications. In some embodiments, a measure of unfairness determined by the difference in the performance of the global model across groups of clients may be determined instead, where this may be an informative metric about the disparate performance of DFL models. Again, none of which is to suggest that any subject matter is disclaimed.

In some embodiments, the seemingly incompatible goals of ensuring group membership privacy and mitigating performance disparity may be reconciled via local differential privacy (LDP). In some embodiments, LDP mechanisms may allow performance disparities to be measured while protecting the privacy of the attributes that define group membership. To compare the mechanisms over a range of privacy levels, number of clients, and group sizes, measurement error such mechanisms induce may be characterized as a function of the privacy budget. In some embodiments, privacy budget allocations may be found that minimize the error under a privacy constraint.

For some embodiments, theoretical analysis may show that the mechanisms may ensure strong privacy guarantees while the measurement error may be relatively low for typical numbers of clients in a DFL setting. In some embodiments, the aggregator of the models, or even a regulatory agency may identify cases of performance disparity in applications where such disparity is undesirable or harmful for some of the groups.

In some embodiments, contributions towards the private measurement of demographic disparities in the performance of FL models may include:

- In some embodiments, local differential privacy mechanisms may provide strong privacy guarantees on the group membership while enabling measurements of the difference in a DFL model's mean performance between demographic groups. These mechanisms may also protect the federated model's performance on the user's data, which may be correlated with group membership.
- In some embodiments, an analysis of the mechanisms over a wide range of privacy levels, number of clients, and group sizes may be performed. To draw a comparison between the mechanisms, a characterization of their measurement error as a function of the privacy budget, and findings of the budget allocation that minimizes this error under a privacy constraint may be made.
- In some embodiments, the trade-offs between privacy and utility that the operator of the mechanisms has to make are determined (e.g., quantitatively, qualitatively, etc.). In some embodiments, mechanisms that can enable mitigation strategies to promote equal model performance across groups in the DFL setting may be provided. Aspects indicate that existing DFL deployments may be able to afford the privacy budgets required by a high-accuracy measurement with strong privacy guarantees.
- Trade-offs for some embodiments are evaluated on data synthetically generated from a real-world dataset. In some embodiments, the results show that the theoretical bounds not only hold, but are significantly more conservative than the empirical errors, indicating that, in practice, the measurements may be more accurate at the same privacy level.

In addition, in some embodiments, a real-world activity detection dataset is used to generate synthetic data and evaluate the error of the mechanisms for a realistic number of clients.

Techniques described herein may be further explicated by reference to "You Can't Fix What You Can't Measure": Privately Measuring Demographic Performance Disparities in Federate Learning, 11 Jan. 2023, https://arxiv.org/abs/2206.12183v1, the entire contents of which is hereby incorporate by reference in its entirety.

Differential Privacy

Differential Privacy (DP) is a privacy technique that bounds the amount of individual information that an adversary can infer from the data. In some embodiments, two main DP trust models—the central and the local model—may be used. The central model may assume a trusted curator that holds a dataset and enforces the DP guarantee on queries performed by external entities. By contrast, in the local model the individuals protect their inputs with DP before sharing them. The local model may not need a curator but may require larger perturbations than the central model for the same privacy guarantee, thus incurring greater error on the utility of the statistics. The local model may better suited for cross-device federated learning (DFL), as it may be unclear who would play the role of a curator in the existing deployments of DFL. In addition, the high number of clients in the typical DFL setting may attenuate the privacy-induced error of an LDP mechanism while eliminating the need for a trusted third-party.

$\epsilon$-Local Differential Privacy ($\epsilon$-LDP)

Hereinafter, $\epsilon$-Local Differential Privacy ($\epsilon$-LDP) may describe a randomized mechanism $\mathcal{M}: D \rightarrow R$, which may satisfy $\epsilon$-LDP where $\epsilon>0$ if, and only if, for any pair of inputs $v, v' \in D$ and for all $y \in R$ Equation 1 holds.

$$\frac{Pr[\mathcal{M}(v) = y]}{Pr[\mathcal{M}(v') = y]} \leq e^{\epsilon} \quad (1)$$

where $\epsilon$ is the privacy budget, Pr is the probability, $\mathcal{M}$ is the mechanism by which an input (e.g., v) is mapped to an output (e.g., y), and the probabilities are taken over the randomness of $\mathcal{M}$.

One of the simplest LDP mechanisms may be Randomized Response (RR). RR was designed to provide plausible deniability to survey respondents. For a binary protected attribute, RR may return the true value with probability a and give the opposite value otherwise (e.g., with probability 1−α). Generalized RR (GRR) may extend RR to a non-binary protected attribute by uniformly distributing the probability of giving a different value.

The GRR Mechanism

The GRR mechanism: For $x \in \{0, \ldots, d\}$, $d \geq 1$, and $$a \in \left[\frac{1}{2}, 1\right],$$

the GRR mechanism, $M_{GRR}$, may be given by Equation 2, below:

$$Pr[M_{GRR}(x; d, a) = y] := \begin{cases} a & \text{if } y = x \\ \frac{1-a}{d-1} & \text{if } y \neq x \end{cases} \tag{2}$$

If $$a = \frac{e^{\epsilon}}{e^{\epsilon} + d - 1},$$

$M_{GRR}$ may be $\epsilon$-LDP, and when d=2, $M_{GRR}$ is the binary RR mechanism.

Federated Learning

FL may allow many clients, each with its own dataset, to train a model on the union of all datasets, without any dataset having to leave its client's device. The training may be distributed over the clients, who train local models on their datasets. The clients may then share the local models' parameters with a central aggregator, who may average them to obtain the parameters of the global model.

There are different types of FL depending on who the clients are. In some embodiments, mechanisms may be focused on cross-device FL (DFL), where clients run on different devices (e.g., smartphones) and the training data usually belongs to the same user. DFL may be becoming increasingly popular in the Big Tech industry.

Motivated by the harms of disparate performance of the global model in DFL, the notion of unfairness may be considered in the DFL setting, which may be the disparate performance across groups of clients with the groups defined by a demographic attribute, such as sex or race.

Formally, an attribute may be a set $\mathcal{A}=\{0, \ldots, d\}$, with $d \geq 1$, that induces a partition of the clients, $\mathcal{P}=\{G_0, \ldots, G_d\}$. There may be K clients and $(g_k, v_k)$ may denote the values of the attribute ($g_k \in \mathcal{A}$) and the performance of the model for client k, respectively. The client may obtain $v_k$ (e.g., the performance of the model for themself) by evaluating the global model on a fraction of their data. The choice of an appropriate performance metric may depend on various factors, such as the learning task and the potential harms in a particular application.

Group Mean Performance

The mean performance of a group $G \in \mathcal{P}$ may be $$m_G := \frac{1}{n} \sum_{i=1}^{n} v_i,$$

where $n=|G|$. To quantify the difference in performance between any two groups, the absolute difference between the mean performances of the global model on the groups may be measured.

Performance Gap

The performance gap between any two A, $B \in \mathcal{P}$ is defined by $\Delta m := |m_A - m_B|$. The difference in performance between any two partitions may be given by the absolute value of the difference between the mean performances of the given partitions.

This notion of (un)fairness may be in contrast with traditional fairness definitions that measure model performance on individual predictions. Previous definitions may be suitable for scenarios where data points represent people and each single prediction concerns an individual (e.g., credit score prediction). However, these definitions may not be suited for the notion of (un)fairness where a data point may represent a group and the model may have different performance levels for different groups. In the typical DFL setting, the global model is distributed to the clients for use on their own data and they are not necessarily the subjects of the predictions. Disparate performance of the global model across groups of users may lead to a disparate impact; in some embodiments, the performance gap may be used to capture this disparity across groups.

Adversary Model

In some embodiments, it may be assumed that the entity performing the measurements of the performance gap is the FL aggregator. In some embodiments, the mechanisms may also be used by an external entity, such as a regulatory agency or a public interest auditor. As is true in some popular DFL deployments, in some embodiments, it may be assumed that the aggregator uses Secure Aggregation. Therefore, in some embodiments, the aggregator may not infer information from the FL updates about the users' protected attributes.

Both the group and the model performance value may contain privacy-sensitive information (the group—because it corresponds to an attribute such as race; the performance—because of the potential correlation with the group). Thus, in some embodiments, the clients may apply an LDP mechanism, $\mathcal{M}$, on their group-value tuples before sending them to the aggregator. A perturbed tuple (e.g., a tuple on which the LDP mechanism $\mathcal{M}$ has been applied) may be denoted by $(g_k', v_k') := \mathcal{M}(g_k, v_k)$. From a privacy perspective, in some embodiments, it may be assumed that the aggregator follows the protocol as intended but may try to learn $g_k$ or $v_k$ from $(g_k', v_k')$.

In some embodiments, an answer to the following question is sought: how can the aggregator measure the performance gap while protecting the privacy of the clients' $(g_k, v_k)$ tuples with an LDP mechanism? To address this question, LDP mechanisms may be designed and the tradeoffs they impose in terms of their privacy guarantees and the error they induce in a measurement may be studied. In some embodiments the number of clients of current DFL deployments may be sufficient to allow for low-error and high-privacy measurements with the mechanisms described herein.

Measuring the Performance Gap

Since the performance gap may be the absolute difference of two group mean performances, private group mean estimation may first be performed and then the privacy guarantees may be shown to hold when combining them into a performance gap estimation.

A major distinction between group mean estimation and population mean estimation may be that, in estimating a group mean performance, the performance may be correlated with the group—especially, if there is a gap (e.g., in performance between groups). In that case, an adversary may be able to learn group information from observing the performance.

In some embodiments, a successful mechanism may protect both group and performance values. A naïve approach is to protect both independently, but that may destroy the necessary information to measure the gap. Thus, in some embodiments, the mechanisms described herein are designed to preserve the overall aggregate correlation between the group and the performance values, while preventing inference of the group that an individual client belongs to from the perturbed tuples.

In some embodiments, the mechanisms may use $\mathcal{M}_{GRR}$ to perturb the group values. Perturbing the group with GRR may provide plausible deniability for group membership. As a result, clients may have less incentives to lie, as they may always claim that the mechanism assigned them to a different group.

In some embodiments, two mechanisms that differ by how they perturb the performance values are used.

The $\mathcal{M}_R$ Mechanism

After perturbing the group (line 1 in Algorithm 1), $\mathcal{M}_R$ may discretize the value with Harmony's discretization (lines 3-5) and then may apply GRR on the discretized value (line 6). The Harmony discretization may allow for unbiased estimates of the expected value from the discretized values. The mechanism may set to zero the performance value of the clients who flip their group (line 2). This may ensure that they do not contribute to the other group's mean performance value.

Algorithm 1: Pseudocode of the privacy mechanism: $M_R$

Input: The client's group $g \in \{0, 1\}$ and performance value $v \in [-1, 1]$.
The privacy budgets $\epsilon_1, \epsilon_2 \in [0, +\infty)$ Output: The perturbed tuple: $(g', v')$, $g' \in \{0, 1\}$ and performance value $v' \in \{-1, 1\}$.

1 $g' \leftarrow M_{GRR}\left(g; d, \frac{e^{\epsilon_1}}{e^{\epsilon_1}+d-1}\right)$ // Perturb the group 2 if $g \neq g'$ then 3 |v ← 0 // The performance distribution of the other group is unknown 4 end Draw $B \sim \text{Bernoulli}\left(\frac{1+v}{2}\right)$ 6 $v' \leftarrow 2 * M_{GRR}\left(B; 2, \frac{e^{\epsilon_2}}{1+e^{\epsilon_2}}\right) - 1$ // Perturb the value and transform 7 return $(g', v')$ The $\mathcal{M}_L$ Mechanism $\mathcal{M}_L$ may be identical to $\mathcal{M}_R$ except that instead of applying GRR to perturb the values, it may use the Laplace mechanism. For continuous values, the classic LDP mechanism may be the Laplace mechanism, which may draw noise from a Laplace distribution and adds it to the inputs. The scale of the noise may vary depending on whether the client's group has been perturbed. Clients whose group is flipped may not require as much noise to hide in the value distribution of the other group, as those values are also perturbed with Laplace noise. Thus, $\mathcal{M}_L$ uses a parameter k, $0<k\leq 2$, that may allow fine-tuning of the scale of the Laplace distribution of the noise for the clients whose group was perturbed. In addition, the value of the clients performance value that switch to another group is set to zero, such that, like in $\mathcal{M}_R$, they do not contribute to that group's mean value.

Because the mechanisms are the composition of the GRR and the Laplace mechanisms, they may have two privacy budget parameters: $\epsilon_1$ and $\epsilon_2$, the privacy budget to protect the group and the performance values, respectively.

In some embodiments, the mechanisms may achieve $\epsilon$-LDP for an overall privacy budget $\epsilon$.

$\mathcal{M}_R$ is $\epsilon$-LDP with $\epsilon=\max\{\epsilon_1, \epsilon_2\}$.

In some embodiments, it may be shown that $\mathcal{M}_R$ is $\epsilon$-LDP with $\epsilon=\max\{\epsilon_1, \epsilon_2\}$. For simplicity, two parameters depending on privacy budgets may be used where $$a = \frac{e^{\epsilon_1}}{e^{\epsilon_1}+d-1} \text{ and } b = \frac{e^{\epsilon_2}}{1+e^{\epsilon_2}}.$$

Input to the mechanism may be denoted using two different inputs $x_0=(g_0, v_0)$ and $x_1=(g_1, v_1)$, while an output of the mechanism may be denoted $y=(g', v')$. For an arbitrary input $x=(g, v)$, the probability is then given by Equation 3, below:

$$Pr[y|x] = \begin{cases} \frac{a(1+(2b-1)v'v}{2} & \text{if } g'=g \\ \frac{1-a}{2(d-1)} & \text{if } g' \neq g \end{cases} \tag{3}$$

In some embodiments, this may be shown for d=1, where the case d>2 may be shown analogously.

Since $v \in [-1,1]$ and $v' \in \{-1,1\}$, an upper bound of $Pr[y|x]$ when $g'=g$ is given by Equation 4:

$$Pr[y|x] \leq ab \tag{4}$$

and a lower bound is given by Equation 5:

$$Pr[y|x] \geq a(1-b) \tag{5}$$

This may give a bound for $Pr[y|x_0]/Pr[y|x_1]$, where $x_0$ and $x_1$ differ in either group or value. If they have the same group but may (or may not) differ in value, the bound may be considered for two cases: $g'=g$ and $g' \neq g$ (where $g=g_0=g_1$)

Case 1: $g'=g$. Using the upper and lower bounds, Equation 6 may be obtained:

$$\frac{Pr[y|x_0]}{Pr[y|x_1]} \leq \frac{ab}{a(1-b)} = e^{\epsilon_2} \tag{6}$$

Case 2: $g' \neq g$. Using the probability of $Pr[y|x_1]$ when $g' \neq g$, Equation 7 may be obtained:

$$\frac{Pr[y|x_0]}{Pr[y|x_1]} = 1 \leq e^{\epsilon_2}, \text{ as } \epsilon_2 \in [0, +\infty) \tag{7}$$

These Equations may show that if the inputs have the same group, the differential privacy guarantee may become the guarantee of the value-perturbing GRR mechanism.

If $x_0$ and $x_1$ differ in group, the analysis may again be broken down into two cases: $g=g_0 \neq g_1$ and $g=g_1 \neq g_0$.

Case 1: $g=g_0 \neq g_1$. Using the upper and lower bounds and taking $\epsilon_2=0$ as the minimum value for the denominator, Equation 8 may be obtained:

$$\frac{Pr[y|x_0]}{Pr[y|x_1]} \leq \frac{2ab}{1-a} = \frac{2e^{\epsilon_2+\epsilon_1}}{1+e^{\epsilon_2}} \leq e^{\epsilon_1} \tag{8}$$

Case 2: $g=g_1 \neq g_0$. Using the lower bound and that $1 \leq e^{\epsilon_2}$ as the minimum value for the denominator, Equation 9 may be obtained:

$$\frac{Pr[y|x_0]}{Pr[y|x_1]} \leq \frac{1-a}{2a(1-b)} = \frac{1+e^{\epsilon_2}}{2e^{\epsilon_1}} \leq \frac{2e^{\epsilon_2}}{2e^{\epsilon_1}} = e^{\epsilon_2-\epsilon_1} \tag{9}$$

By combining the equations above, it may be concluded that $\mathcal{M}_R$ is $\epsilon$-DP with $\epsilon=\max\{\epsilon_1, \epsilon_2, \epsilon_1-\epsilon_2\}=\max\{\epsilon_1, \epsilon_2\}$ and, thus, the optimal privacy budget allocation may be $\epsilon_1=\epsilon_2=\epsilon$ The mechanism $\mathcal{M}_L$ is $\epsilon$-LDP with a privacy budget E given by Equation 10:

$$\epsilon = \max\left\{\epsilon_2, \ln\left(\frac{2}{k}\right) + \frac{\epsilon_2}{2} - \epsilon_1, \ln\left(\frac{2}{k}\right) + \frac{\epsilon_2}{2} + \epsilon_1\right\} \tag{10}$$

In some embodiments, it may be shown that Equation 10 holds. For example, for k=2, although this may also hold for other values of k. Input to the mechanism may be denoted using two different inputs $x_0=(g_0\ v_0)$ and $x_1=(g_1, v_1)$, while an output of the mechanism may be denoted $y=(g', v')$. Because $\mathcal{M}_L$ perturbs the values with Laplacian noise, for an arbitrary input $x=(g, v)$, the probability may be given by Equation 11, below:

$$Pr[y|x] = \begin{cases} \frac{e^{\epsilon_1}}{e^{\epsilon_1}+d-1} f_{Lap\left(0,\frac{2}{e_2}\right)}(v-v') & \text{if } g'=g \\ \frac{1}{e^{\epsilon_1}+d-1} f_{Lap\left(0,\frac{2}{e_2}\right)}(v') & \text{if } g' \neq g \end{cases} \tag{11}$$

This may be because when the mechanism preserves the group, $v'=v+Y$ where $$Y \sim \text{Lap}\left(0, \frac{2}{\epsilon_2}\right),$$

hence the probability of the new value is the probability of sampling $v'-v$ from the Laplace distribution with zero mean and scale of $$\frac{2}{\epsilon_2}.$$

When the group is flipped, the mechanism sets v to zero, therefore in that case it is the probability of sampling v' from $$\text{Lap}\left(0, \frac{k}{\epsilon_2}\right)$$

As shown for $\mathcal{M}_R$, this can be shown using case-based reasoning. If $x_0$ and $x_1$ have the same group but differ in value, two cases $g'=g$ and $g' \neq g$ may be considered.

Case 1: $g'=g$.

$$\frac{Pr[y|x_0]}{Pr[y|x_1]} = \frac{f_{Lap\left(0,\frac{2}{e_2}\right)}(v'-v_0)}{f_{Lap\left(0,\frac{2}{e_2}\right)}(v'-v_1)} = e^{\epsilon_2\left(\frac{|v'-v_1|}{2}-\frac{|v'-v_0|}{2}\right)} \leq e^{\epsilon_2} \tag{12}$$

Case 2: $g' \neq g$.

$$\frac{Pr[y|x_0]}{Pr[y|x_1]} = \frac{f_{Lap\left(0,\frac{2}{e_2}\right)}(v')}{f_{Lap\left(0,\frac{2}{e_2}\right)}(v')} = 1 \tag{13}$$

If $x_0$ and $x_1$ differ in group, two additional cases $g=g_0 \neq g_1$ and $g=g_1 \neq g_0$ may be considered.

Case 1: $g=g_0 \neq g_1$:

$$\frac{Pr[y|x_0]}{Pr[y|x_1]} \leq \frac{\frac{e^{\epsilon_1}}{e^{\epsilon_1}+d-1} f_{Lap\left(0,\frac{2}{e_2}\right)}(v'-v_0)}{\frac{e^{\epsilon_1}}{e^{\epsilon_1}+d-1} f_{Lap\left(0,\frac{2}{e_2}\right)}(v')} = e^{\epsilon_1+\epsilon_2\left(\frac{|v'|}{2}-\frac{|v'-v_0|}{2}\right)} \leq e^{\epsilon_1+\frac{\epsilon_2}{2}} \tag{14}$$

where the last inequality follows from $$\frac{|v'|}{2} - \frac{|v'-v_0|}{2} \leq \frac{1}{2}.$$

Case 2: $g=g_1 \neq g_0$:

$$\frac{Pr[y\,|\,x_0]}{Pr[y\,|\,x_1]} = e^{\epsilon_2\left(\frac{|v'-v_1|}{2}-\frac{|v'|}{2}\right)-\epsilon_1} \leq e^{\frac{\epsilon_2}{2}-\epsilon_1} \tag{15}$$

where the last inequality follows from the triangle inequality:

$$\frac{|v'-v_1|}{2} - \frac{|v'|}{2} \leq \frac{|v_1|}{2} \leq \frac{1}{2}.$$

Finally, combining all the inequalities above (e.g., Equations 12-15), the E in the bound of the probability ratio may be found as Equation 16, below:

$$\epsilon = \max\left\{\epsilon_2, \frac{\epsilon_2}{2} - \epsilon_1, \frac{\epsilon_2}{2} + \epsilon_1\right\} = \max\left\{\epsilon_2, \frac{\epsilon_2}{2} + \epsilon_1\right\} \tag{16}$$

Thus, the optimal budget allocation for mechanism $\mathcal{M}_L$ with k=2 may be $\epsilon_2=\Sigma$ and $$\epsilon_1 = \frac{\epsilon}{2}$$

These bounds may be tighter than the ones obtained with the basic theorem on sequential composition of DP mechanisms. The tightness of the LDP bound may be important to provide an upper bound for the privacy of the mechanism, when comparing it with other mechanisms, as well as quantifying the privacy vs. utility tradeoff.

Performance Evaluation

In some embodiments, to measure the privacy-induced error, the measurement may be treated as an estimator of $m_G$ under the randomness of the mechanisms. A key metric of the quality of an estimator is its Mean Squared Error (MSE), as it may capture the error due to both the estimator's variance and its bias. Based on a showing that the estimators are unbiased, their MSEs may be compared by simply comparing their variance. Further, knowing the estimators' variance allows probabilistic bounding of the distance between a performance gap measurement and its true value as a function of the number of clients, which is informative to assess the feasibility of the mechanisms in a DFL setting.

The estimators that the operator may use to estimate $m_G$ from the perturbed group-performance tuples are as follows.

Estimators of $m_C$

The estimators for the mechanisms may be given by Equation 17, below:

$$\hat{m}_G^L := \frac{1}{an}\sum_{j=1}^{n'} v'_j \text{ and } \hat{m}_G^R := \frac{1}{a(2b-1)n}\sum_{j=1}^{n'} v'_j \tag{17}$$

where $$a = \frac{e^{\epsilon_1}}{e^{\epsilon_1}+d-1} \text{ and } b = \frac{e^{\epsilon_2}}{1+e^{\epsilon_2}},$$

n=|G|, and n' is the number of clients in group G after the mechanism's perturbation.

The estimators of the mechanisms may be unbiased, such that:

$$\mathbb{E}[\hat{m}_G^L] = \mathbb{E}[\hat{m}_G^R] = m_G.$$

In some embodiments, it may be shown that $$\hat{m}_G^L$$

is unbiased. Analogously, it may also be shown that $$\hat{m}_G^R$$

is unbiased.

In some embodiments, values in G may be modeled after applying $\mathcal{M}_L$ with the mutually independent random variables, such as shown in Equations 18 and 19:

$$V_i = B_i(v_i + Y_i),\ i = 1, \ldots, n \tag{18}$$

$$\overline{V}_j = \overline{B}_j(0 + \overline{Y}_j) = \overline{B}_j\overline{Y}_j,\ j = 1, \ldots, K-n \tag{19}$$

where $V_i$ and $\overline{V}_j$ are the final, perturbed values in group G that originate from group G and $\overline{G}$, respectively. The bar may denote that the random variable relates to group $\overline{G}$, the complement of G. The random variables $B_i$~Bernoulli(a) and $\overline{B}_j$~Bernoulli(1−a) may model $\mathcal{M}_{RR}$, and $Y_i$~Lap(0, 2/$\epsilon_2$), and $\overline{Y}_j$~Lap(0, k/$\epsilon_2$), may model $\mathcal{M}_{Lap}$. Thus, the expected value of the estimator may be given by Equations 20-25

$$\mathbb{E}[\hat{m}_G^L] = \frac{1}{an}\left(\sum_{i=1}^{n}\mathbb{E}[V_i] + \sum_{i=1}^{K-n}\mathbb{E}[\overline{V}_j]\right) \quad \text{Linearity of } \mathbb{E} \tag{20}$$

$$= \frac{1}{an}\left(\sum_{i=1}^{n}\mathbb{E}[B_i(v_i + Y_i)]\right) \quad \mathbb{E}[\overline{V}_i] = 0 \tag{21}$$

$$= \frac{1}{an}\sum_{i=1}^{n}\mathbb{E}[B_i](v_i + \mathbb{E}[Y_i]) \quad \text{Mutual independence} \tag{22}$$

$$= \frac{1}{an}\sum_{i=1}^{n}\mathbb{E}[B_i]v_i \quad \mathbb{E}[Y_i] = 0 \tag{23}$$

$$= \frac{1}{an}\sum_{i=1}^{n}v_i \quad \mathbb{E}[B_i] = a \tag{24}$$

$$= m_G \tag{25}$$

In some embodiments, $\mathbb{E}[\overline{V}_j]=0$ because $E[\overline{V}_j]=0$ and that the random variables may be mutually independent.

In some embodiments, it may be shown that estimators themselves are unbiased. A closed-form expressions of their variance may be obtained, hence their MSE.

Using a probabilistic model (as described in Equations 18 and 19), a variance of the estimator $$\hat{m}_G^L$$

may be determined as shown in Equation 26:

$$\mathrm{Var}[\hat{m}_G^L] = \frac{1}{a^2n^2}\mathrm{Var}\left[\sum_{i=1}^{n}(v_i + Y_i)B_i + \sum_{j=1}^{K-n}\overline{Y}_j\overline{B}_j\right] \tag{26}$$

The noise terms may have positive variance and therefore do not cancel out. In some embodiments, the fact that the variables are mutually independent may be used to write the variance of the sum as the sum of variances. The variances of products may then be obtained and may be used with well-known formula for the variance of the product of two independent random variables. Rearranging the terms gives the closed expression of the variance as shown in Equation 27:

$$\mathrm{Var}[\hat{m}_G^L] = \frac{1}{n}\left(v^2 e^{-\epsilon_1} + (1+e^{-\epsilon_1})\left(\sigma_L^2 + \frac{K-n}{n}\overline{\sigma}_L^2 e^{-\epsilon_1}\right)\right) \quad (27)$$

where $$v^2 = \frac{1}{n}\sum_{i=1}^{n} v_i^2,$$

and $$\sigma_L^2, \overline{\sigma}_L^2$$

are the variances of the Laplace noise distributions (functions of $\epsilon_2$), for clients who do not swap and those who do, respectively. The lower and upper bounds as shown in graph 100 of FIG. 1 are taken using that $0 \leq v^2 \leq 1$ The closed-form expression of $$\hat{m}_G^R\text{'s}$$

variance may be obtained similarly, and is given by Equation 28:

$$\mathrm{Var}[\hat{m}_G^R] = \frac{1}{a(2b-1)^2 n}\left(1 - a(2b-1)^2 v^2 + \frac{K-n}{n}\frac{1-a}{a}\right) \quad (28)$$

where a and b are functions of the privacy budgets as previously described.

$\Delta\hat{m}^*$ is an unbiased estimator of $\Delta m$ for the two groups G, $G \in \mathcal{P}$ with MSE given by Equation 29.

$$MSE[\Delta\hat{m}^*] = MSE[\hat{m}_G^*] + MSE[\hat{m}_{\overline{G}}^*] \quad (29)$$

This is based on the unbiasedness of $\Delta\hat{m}^*$. Due to the unbiasedness of $$\hat{m}_G^L$$

and the linearity of expectation, the expected value of $\Delta\hat{m}^*$ is $\Delta m$. Assuming that G is the advantaged group and thus $$\hat{m}_G^* \geq \hat{m}_{\overline{G}}^*,$$

this means that $$\mathbb{E}[|\hat{m}_G^* - \hat{m}_{\overline{G}}^*|] = |m_G - m_{\overline{G}}|.$$

To show that the variance of $\Delta\hat{m}^*$ is the sum of the variance of the mean group value estimators, it sufficies to show that $$Cov(\hat{m}_G^*, \hat{m}_{\overline{G}}^*) = 0,$$

which is true if, and only if, $$\mathbb{E}[\hat{m}_G^*, \hat{m}_{\overline{G}}^*] = m_G m_{\overline{G}}.$$

By calculating the value of that expectation explicitly, it is observed that many of its terms have an independent Laplace r.v. as a factor and, consequently, these terms become zero. Finally, Bienaymé's identity may be applied to obtain the result shown in Equation 29.

The proof for $\mathcal{M}_L$ is similar, as the expected value of clients with the group perturbed is zero.

In some embodiments, even though $\tilde{m}_G^*$ and $\tilde{m}_{\overline{G}}^*$ are not independent, the errors are uncorrelated, and thus they may add up. Therefore, a closed-form expression of the MSE of $\Delta m$ may be obtained by adding the closed-form expressions of the group MSEs.

MSE for a Fixed Privacy Budget

As shown previously, the privacy budgets $\epsilon_1$ and $\epsilon_2$ have a different impact on the LDP bound of the mechanism. In some embodiments, to draw a fair comparison between the mechanisms, the parameters that minimize the error on utility for a fixed overall privacy budget $\epsilon$ may be found. Using the closed-form expression of the MSE of $\Delta\hat{m}^*$, the estimators for specific values of $\epsilon_1$ and $\epsilon_2$ may be compared. In some embodiments, it may be unclear a priori how to divide a fixed privacy budget into the mechanism's group and performance components to maximize utility. In some embodiments, an allocation that minimizes the MSE of the estimators may be found, for the total privacy budget of the mechanism ($\epsilon$).

Comparison of the Mechanisms

In FIG. 1, MSE of the performance gap estimator for two groups G and G of the same size is plotted. $\mathcal{M}_L$ opt. and $\mathcal{M}_R$ opt. are the mechanisms with optimal parameters. Since the specific set of $v_k$'s has an impact on the MSE, in the graph the lower and upper bounds for each mechanism are shown, which enclose a (colored) region of MSEs.

In the example depicted, $\mathcal{M}_L$ opt. achieves lower MSE than $\mathcal{M}_L$ with k=2 for the range of $\epsilon$ shown. $\mathcal{M}_R$ opt.'s MSE is lower than $\mathcal{M}_L$ opt. only when $0.31 \lesssim \epsilon \lesssim 2.6$ but, for $\epsilon \gtrsim 2.6$ the upper bound of $\mathcal{M}_R$ opt.'s MSE is larger than the upper bound of $\mathcal{M}_L$ opt.'s and the gap between the two rapidly widens for larger privacy budgets. As a consequence, there is no overall best mechanism and the operator should select the one that best suits their budget.

Unbalanced Groups

Figure 2:
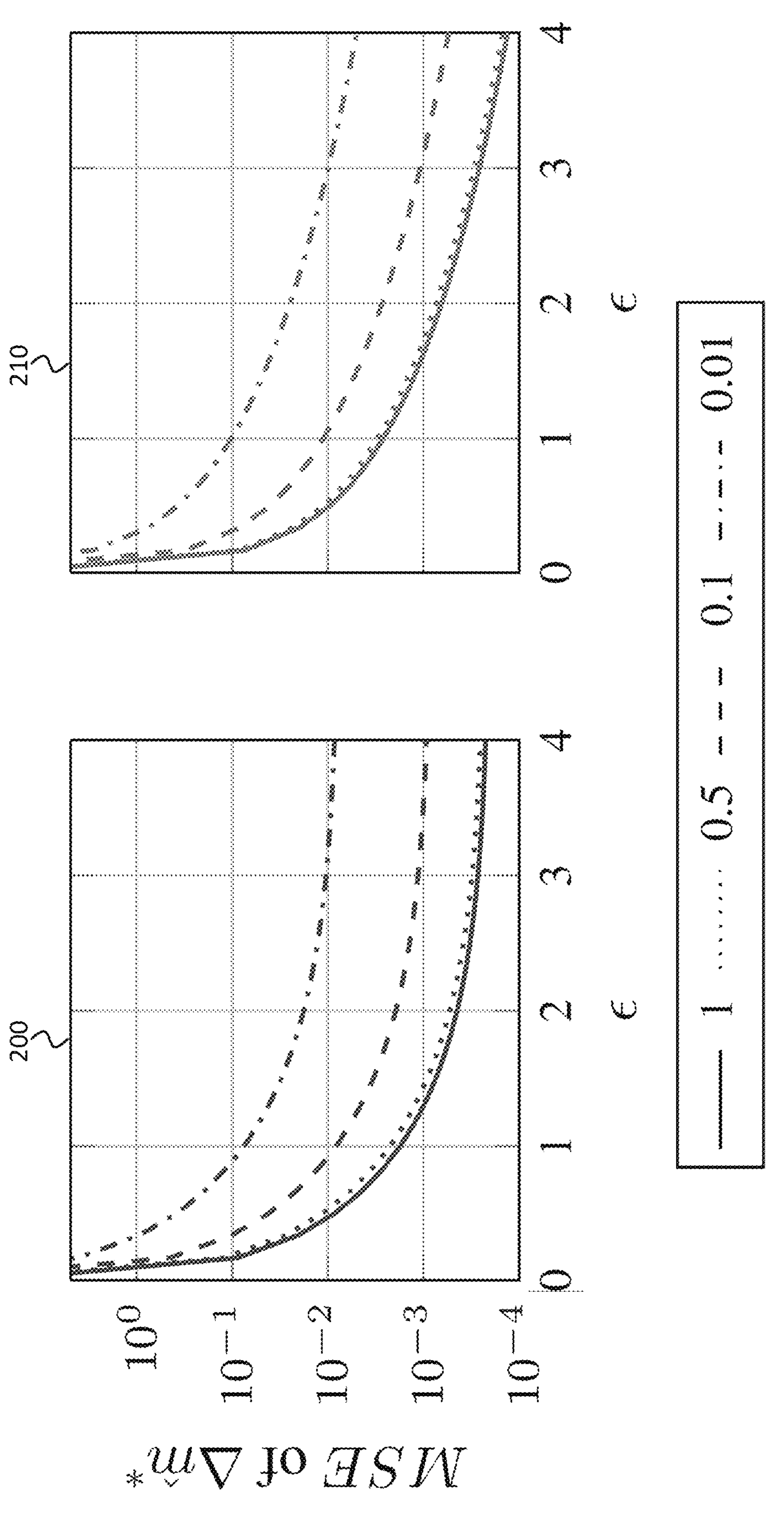
FIG. 2 is depicts graphs of the upper bounds of the MSEs for two groups with different size ratios, in accordance with one or more embodiments.

In some embodiments, the impact that an unbalance of group sizes has on the MSE of the estimators is studied. FIG. 2 depicts the upper bounds of the MSEs, $\mathcal{M}_R$ opt. (left) in graph 200 and $\mathcal{M}_L$ in graph 210 with k=2 (right), for two groups with different size ratios. As shown, the mechanisms can cope with relatively small groups, but the MSE rapidly grows for minorities that account for less than 1% of the clients. Consequently, the mechanisms would incur high MSE with protected attributes that include small minorities, but would maintain low MSEs for protected attributes like gender and race.

In some embodiments, it has been assumed that the entity performing the measurements knows n. FIG. 2 also quantifies the difference of the mechanisms' MSE when the operator incorrectly estimates the group fractions. For example, when the groups are balanced and the estimate of the group fractions has a relative error of up to 50%, the difference in the MSE values (i.e., the difference between the bold and dotted lines) may be insignificant. This means that the assumption of knowing n may be relaxed in practice to a large extent.

Precision Relative to the Number of Clients

In some embodiments, the mechanisms may allow for high-precision measurements with realistic numbers of clients in the DFL setting. Using Equation 29, a Chebyshev concentration bound may be found and the privacy budget E may be found numerically such that $|\Delta m_G^* - \Delta m| < \alpha$, for a small $\alpha > 0$, with high probability.

TABLE 1

Minimum privacy budget ($\epsilon$) required to bound the error by $\alpha$, given K clients, with 0.99 probability. Highlighted are the $\epsilon$'s that are considered reasonable.

| | $\mathcal{M}_R$ opt. | | | $\mathcal{M}_L$ opt. | | |
|---|---|---|---|---|---|---|
| K | $\alpha = 10^{-1}$ | $\alpha = 10^{-2}$ | $\alpha = 10^{-3}$ | $\alpha = 10^{-1}$ | $\alpha = 10^{-2}$ | $\alpha = 10^{-3}$ |
| $10^5$ | 1.86 | — | — | 2.56 | 17.89 | 178.89 |
| $10^6$ | 0.63 | — | — | 0.71 | 6.32 | 56.57 |
| $10^7$ | 0.23 | 1.86 | — | 0.21 | 2.56 | 17.89 |
| $10^8$ | 0.08 | 0.63 | — | 0.07 | 0.71 | 6.32 |
| $10^9$ | 0.02 | 0.23 | 1.86 | 0.02 | 0.21 | 2.56 |

Table 1 shows the minimum privacy budget required to ensure that the error is at most $\alpha$ for various values of $\alpha$ and numbers of clients K, with probability 0.99, for some embodiments. If the operator may afford a higher privacy budget, the bound may still hold but if their privacy budget is lower, the mechanism may not guarantee the bounds.

Due to $\mathcal{M}_R$'s discretization step, the maximum estimator variance (attained when all the performance values are zero) tends to a constant (indirectly proportional to group size). Thus, there may be no budget that allows to achieve $\alpha$ for those cells marked with "–".

These results show that the privacy budgets to achieve an error of less than one percentage point and less of one tenth of a percentage point may be reasonable for $K \le 10_7$ and $K \ge 10^9$ clients, respectively. Even though these may look like large numbers of clients, current DFL deployments have this many, and even more, clients. For example, in 2018 Apple reported a total of half a billion active Ski clients and, in the same year, Gboard surpassed 1 billion installs.

In some embodiments, these bounds may be evaluated on a real-world dataset of performances of a simulated FL deployment. In some embodiments, results show that the bounds not only hold but that they may be overly conservative: in practice, the operators of the mechanisms may be able to ensure the same privacy level by spending less privacy budget. The Chebyshev bounds are known to be loose because they do not make assumptions about the underlying distributions; consequently, tighter bounds may be found.

DP and Secure Multi-Party Computation (SMPC) rely on a third-party to detect and mitigate discrimination. Various DP versions of existing post- and in-processing techniques may be used to train classifiers that satisfy the Equalized Odds constraint. In some embodiments, the mechanisms may operate based on a notion of performance gap as it is more tailored for the DFL setting. In addition, a previous focus has been on mitigating the disparity assuming that it has occurred, while, in some embodiments, the measurement of the disparity is focused on rather than its mitigation.

In contrast to SMPC, the mechanisms described herein may have low computational and bandwidth costs, and may be more robust to client dropouts. Moreover, SMPC and DP provide different privacy guarantees; in particular, SMPC does not limit the information about individual group membership that the aggregator can infer from the measurements.

In some embodiments, the mechanisms described herein may allow the clients and the mechanism operator to measure the performance gap without the aggregator's collaboration.

With FL gaining traction in industry and academia, there is a growing concern that models trained with it will exhibit disparate performance across demographic groups, leading to harms ranging from a mere inconvenience to disparate impact, such as increased surveillance and lower online security for some of the groups. In some embodiments, the performance gap between demographic groups is considered as a notion of (un)fairness in the DFL setting, and the ability to measure it may be crucial towards addressing such harms. However, especially under the privacy aspirations of federated learning, lack of demographic data may hinder the applicability of existing techniques to measure performance disparities in DFL models. This may pose an obstacle to mitigating the harms; e.g., "we can't address what we can't measure."

In some embodiments, to address the legal, societal, and individual concerns related to the privacy of demographic data, locally differentially private mechanisms are applied that estimate the performance gap while protecting the privacy of the group membership and potentially correlated data such as model performance. For some embodiments, theoretical and experimental results may show that the mechanisms ensure strong privacy guarantees while performing relatively precise performance gap measurements when relying on realistic numbers of clients in the DFL setting and reasonable privacy parameters. In some embodiments, the large scale of existing DFL deployments may offer a unique opportunity to measure and expose the potential disparities while guaranteeing strong privacy to the participants.

Allocating the Privacy Budget for the $\mathcal{M}_L$ Mechanism

Based on Equation 27, it can be seen that the variance of the unbiased estimator for $\mathcal{M}_L$ is dominated by $\epsilon_2$. Therefore, since $\epsilon_1$; $\epsilon_2$, and k must satisfy Equation 10, the MSE may be minimized by first setting $\epsilon_2 = \epsilon$ and, then, finding the k that maximizes $\epsilon_1$ under the LDP constraint in Equation 10.

So, if $\epsilon_2=\epsilon$ in Equation 1, bounds for $\epsilon_1$ can be obtained as shown in Equation 30, below.

$$\ln\left(\frac{2}{k}\right)-\frac{\epsilon}{2}\leq\epsilon_1\leq\ln\left(\frac{2}{k}\right)+\frac{\epsilon}{2}\lambda(k)) \tag{30}$$

where $$\lambda(k)=2\left(1-\frac{1}{k}\right).$$

Thus, this inequality holds iff$\frac{2}{3}\leq k$.

In order to find the k that maximizes $\epsilon_1$, two cases may be considered: $0<\epsilon<\frac{2}{3}$, and $\frac{2}{3}\leq\epsilon$.

If $\frac{2}{3}\leq\epsilon$, $\epsilon_1$ may be rewritten as the upper bound of $\epsilon$ in Equation 30, a function of k, and find that $k=\epsilon$ is a maximum for a constant $\epsilon$. However, for $0<k<\frac{2}{3}$, Equation 30 does not hold and hence $k=\epsilon$ would not satisfy $\epsilon$-LDP. When $0<\epsilon<\frac{2}{3}$, $k=\frac{2}{3}$ may be used as the value of k, the minimum k that satisfies $\epsilon$-LDP, as that may minimizes the scale of the Laplace noise. In that case, $\epsilon_1$ may be equal to the upper and lower bounds in Equation 30.

Thus, the maximum $\epsilon_1$ as a function of $\epsilon$ may be given by Equation 31, below, as:

$$\epsilon_1=\begin{cases}\ln\left(\frac{2}{\epsilon}\right)+\epsilon-1 & \text{if } \frac{2}{3}\leq\epsilon\\ \ln(3)-\frac{\epsilon}{2} & \text{if } 0<\epsilon<\frac{2}{3}\end{cases} \tag{31}$$

Figure 3:
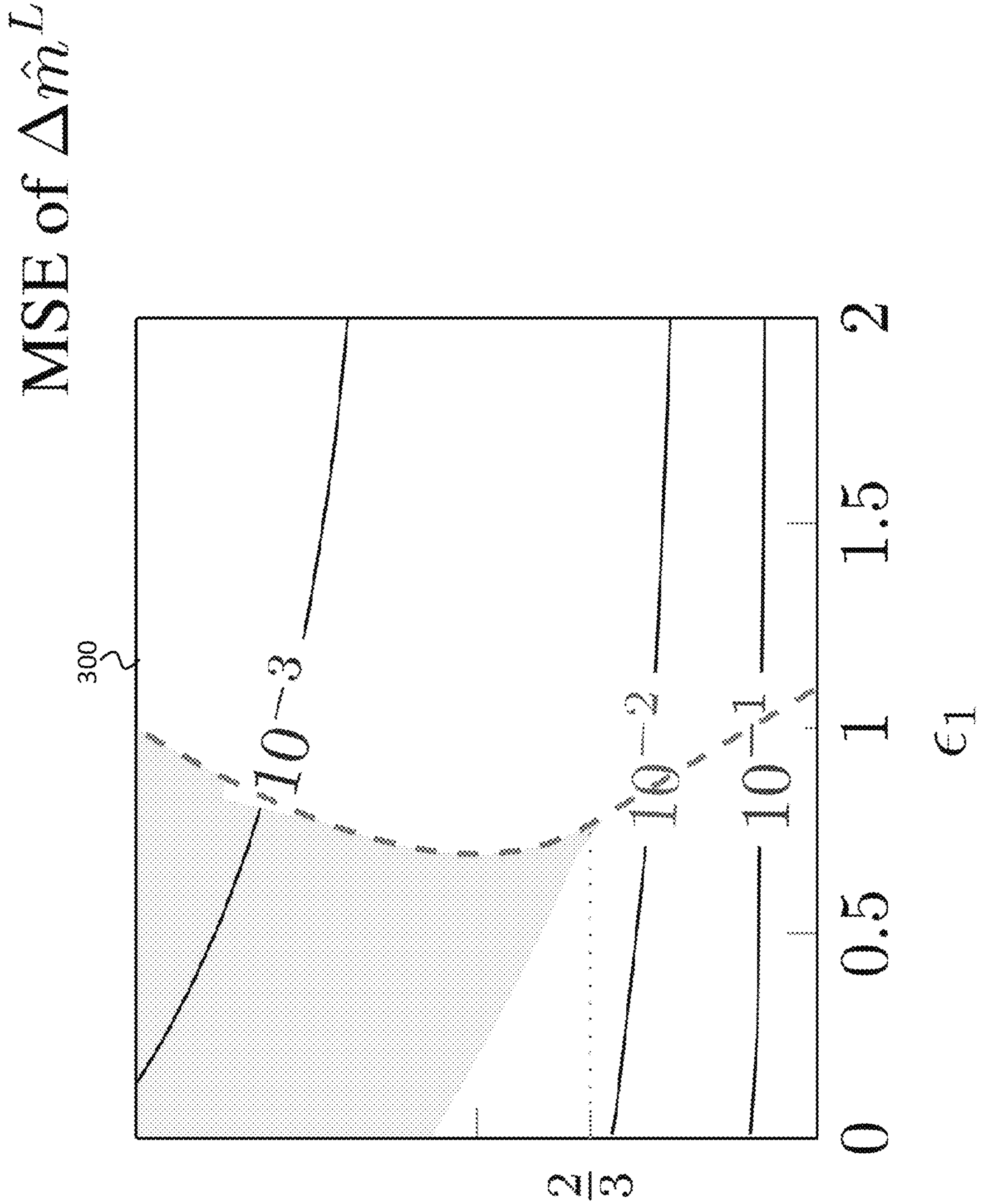
FIG. 3 is a graph that depicts allocations of privacy budgets which satisfy the locally differentially private (LDP) constraint, in accordance with one or more embodiments.

FIG. 3 shows the allocations of the privacy budgets that satisfy the LDP constraint (shaded area) in graph 300. The dashed and dotted borders of the area show the allocations that minimize the MSE for a total privacy budget of $\epsilon=\epsilon_2\in(0,2]$ for k=2 and $k=\frac{2}{3}$, respectively. A closer look at the MSE contour lines reveals that the mechanism with $k=\frac{2}{3}$ achieves lower MSE values than for k=2 when $\epsilon<\frac{2}{3}$.

Empirical Validation

Figure 4:
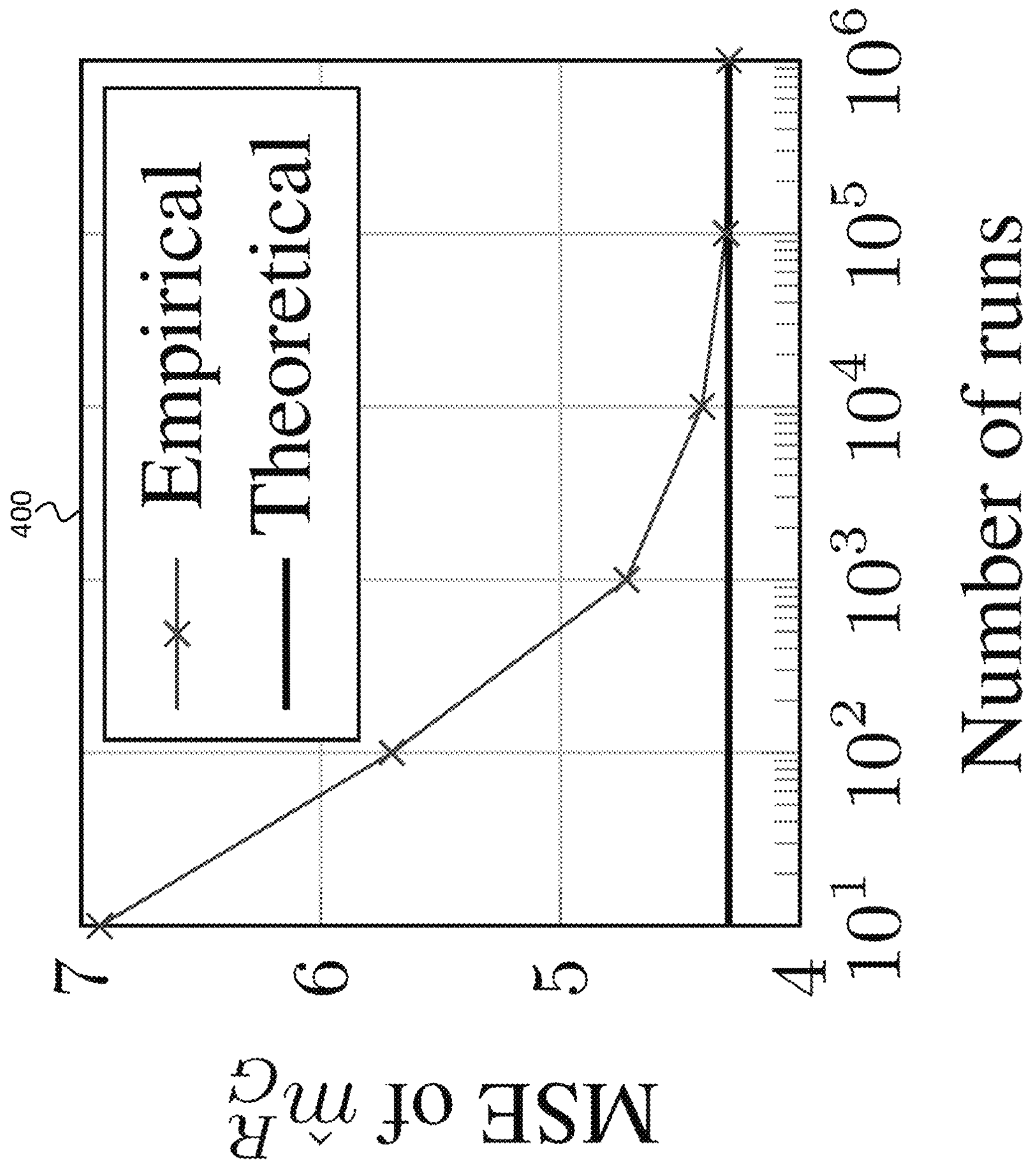
FIG. 4 is a graph of the empirical and theoretical MSE for a mechanism, in accordance with one or more embodiment.

For some embodiments, experiments have been run to validate the correctness of the expressions of the variance of the estimators. In the experiments, two groups were initialized with 10 clients each with fixed performance values. Then, the mechanisms were run a number of times to obtain sets of perturbed tuples and the performance gap estimates were calculated. The empirical MSE is the average of the squared differences between these estimates and the true performance gap. The empirical and theoretical MSE for mechanism $\mathcal{M}_R$ are plotted in graph 400 of FIG. 4. It can be seen that, as the number of runs increases, the empirical MSE converges to the theoretical MSE, validating the results.

Empirical Evaluation

For some embodiments, the experiment were performed to evaluate the error of the mechanisms. Since public datasets with sufficient data to model a real-world deployment of DFL are difficult to obtain, a dataset was synthesized by fitting the marginal probability distributions of the protected attribute on a real-world dataset. For some embodiments, results show that the error of the mechanisms in the synthetic data may be orders of magnitude lower than the Chebyshev bounds—obtained as described in a previous section—indicating that an operator who uses the Chebyshev bounds may be overly conservative in their privacy risk assessment.

Data Generation

In some embodiments, a data generation model may be based on an activity detection dataset. The dataset comprises sensor readings for 14 subjects who were instructed to perform a number of scripted daily activities in two different rooms. The features include the sensor's readings of time, accelerometer position, and radio signal's strength, frequency, and phase. The labels describe one of these activities: sitting, lying down, or ambulating. In some embodiments, the detection task was binarized by relabeling the data to whether or not the subject was lying down.

In some embodiments, "sex" was selected as the protected attribute in the data. Although the sex of the subject was annotated per each trial-25 male and 62 female—there was no mapping between trials and subjects. Thus, it was assumed that each recorded session represents a different FL client, with each client having an average of 864 samples. In some embodiments, the data was stratified ensuring that clients have the same data distribution between training and test sets (70% of the samples for training and 30% for testing).

In some embodiments, federated learning of a model was simulated by training a logistic regression model. In some embodiments, this may the global model trained with the data of all clients. Since the performance of the model, as simulated, was nearly perfect, resulting in almost all the clients having a zero false positive rate, some of the accelerometer features were dropped (e.g., discarded) to increase the difficulty of the learning task. The global model's hold-out average test accuracy for 10 runs was 84.37%, with a false positive rate (FPR) of 10.69%, and a true positive rate (TPR) of 82.05% (all SD values are smaller than 1%). Then, in some embodiments, the global model was independently tested on each client's test set, resulting in two performance values for each client. The TPR and the FPR may be used as performance metrics: the mean TPRs are 89.01% and 71.77% and the mean FPRs are 15.26% and 24.90% for males and females, respectively. In some embodiments, a significant performance gap was observed on both metrics: $\Delta$TPR=17.33% and $\Delta$FPR=9.63%.

Regression Model Implementation

In some embodiments, the evaluation of the logistic regression model was implemented with Python 3.7.6 and sklearn 0.22.1.

In some embodiments, Elastic-Net loss (with a 0.99 L1 component) was used and SAGA as the algorithm to minimize it. In some embodiments, to balance the classes, class weights were adjusted inversely proportional to class frequency. In some embodiments, to find these hyperparameters, optimization for best generalization performance was not performed, as in inducing an disparate performance between the groups in test data may be desirable.

For some embodiments, the model selection was evaluated by 10 runs of hold-out cross-validation (70-30% as the random training-testing split). For some embodiments, a PRNG seed was fixed and the source code provided.

Error of the DP Mechanism

In some embodiments, to generate synthetic data for the global model's performance on new clients, the marginal distribution of sex may be modeled to have the same mean and $v^2$ as the observations. For the purpose of evaluating the error of the mechanisms, the exact distribution is fit may not be important, thus samples may be drawn with replacement from the set of observations. This sampling methodology may ensure that the relevant statistics are preserved and enough data may be generated to represent a realistic DFL deployment.

Table 2 compares the empirical error with the 0.99-probability bounds (a) obtained with the procedure explained in the previous section, for a range of privacy budgets (c). The bounds are one order of magnitude larger than the actual error. This means that the budget that the operator may need to allocate to satisfy a certain α for $10^7$ clients may be substantially lower than the ones shown in Table 1. As a consequence, following the Chebyshev bounds from the previous section may result in an overly conservative measurement with respect to the privacy of the users, and operators with small privacy budgets may be able afford more accurate measurements without an impact on user privacy

TABLE 2

Comparison of the Chebyshev bounds with the empirical mean error of 10 runs of the mechanisms on the synthetic dataset for K = $10^7$ clients. The first column is the privacy budget, followed by the mean error (and standard deviation) of the estimates on the data and the 0.99-probability Chebyshev's bounds (α) for each mechanism.

| | $\mathcal{M}_R$ opt. | | $\mathcal{M}_L$ opt. | |
|---|---|---|---|---|
| ϵ | $\lvert\Delta\hat{m}^R - \Delta m\rvert$ | α | $\lvert\Delta\hat{m}^R - \Delta m\rvert$ | α |
| 0.01 | 0.1241(±0.1410) | 1.2586 | 0.0504(±0.0337) | 1.0525 |
| 0.10 | 0.0082(±0.0059) | 0.1206 | 0.0046(±0.0040) | 0.1060 |
| 1.00 | 0.0008(±0.0006) | 0.0094 | 0.0008(±0.0005) | 0.0118 |
| 10.00 | 0.0001(±0.0000) | 0.0032 | 0.0001(±0.0000) | 0.0009 |

Figure 5:
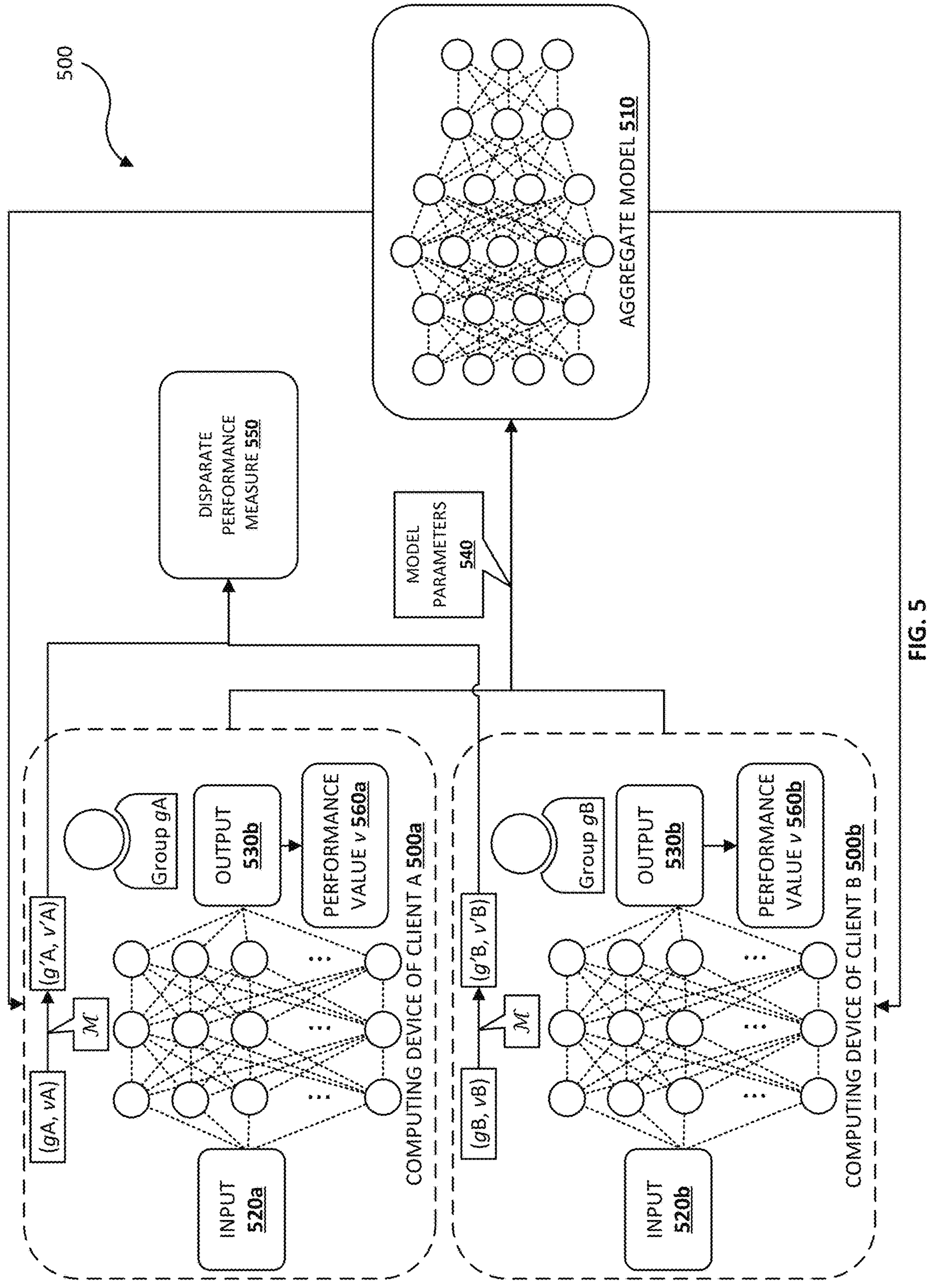
FIG. 5 is a system diagram that illustrates an example distributed computing system that may be used to implement techniques described herein.

FIG. 5 is a system diagram that illustrates an example distributed computing system that may be used to implement techniques described herein. Various portions of systems and method described herein may include of be executed on a system of computing devices similar to distributed system 500. Further, processes and modules described herein may be executed by one or more processing systems similar to that of distributed system 500.

Distributed system 500 may include an aggregate model 510. The aggregate model 510 may operate based on federated learning. The aggregate model 510 may be an aggregator, which may learn parameters from clients, such as client A and client B. Although client A and client B are depicted, the aggregate model 510 may have many clients, including 10s of clients, 100s of clients, etc. The number of clients may be given by client population K, which may be $10^7$ or even greater. The aggregate model 510 may be any appropriate model.

Distributed system 500 may include computing devices of users, such as a computing device of client A 500*a* and a computing device of client B 500*b*. Each client may have sensitive attributes. Each client may have a group membership, such as gA for client A and gB for client B. Client group membership may be a sensitive attribute. Each client may operate a local mode, such as on a client computing device. Each client's local model may be independently trained, such as based on client data. Each client's local model may receive parameters from the aggregate model 510 and then train such parameters. Each client's local model may send model parameters 540 to the aggregate model 510 after training, upon which the aggregate model 510 may be updated. For each user, the local model may receive an input, such as input 520*a* for client A and input 520*b* for client B. For each user, the local model may produce an output, such as output 530*a* for client A and output 530*b* for client B. The performance of the local model may be evaluated based on the local output, such as to produce a performance value v 560*a* for client A and a performance value v 560*b* for client B. The performance of the local model may be a sensitive attribute. A mechanism $\mathcal{M}$, which may be $\mathcal{M}_R$ or $\mathcal{M}_L$, may be used to protect the privacy of a client's sensitive attribute. The mechanism $\mathcal{M}$ may operate on the client's computing device, such as within a security envelope. The mechanism $\mathcal{M}$ may produce a perturbed tuple which may be used to generate a disparate performance measure 550, which may measure the difference in performance for members of various groups while maintaining group privacy.

Figure 6:
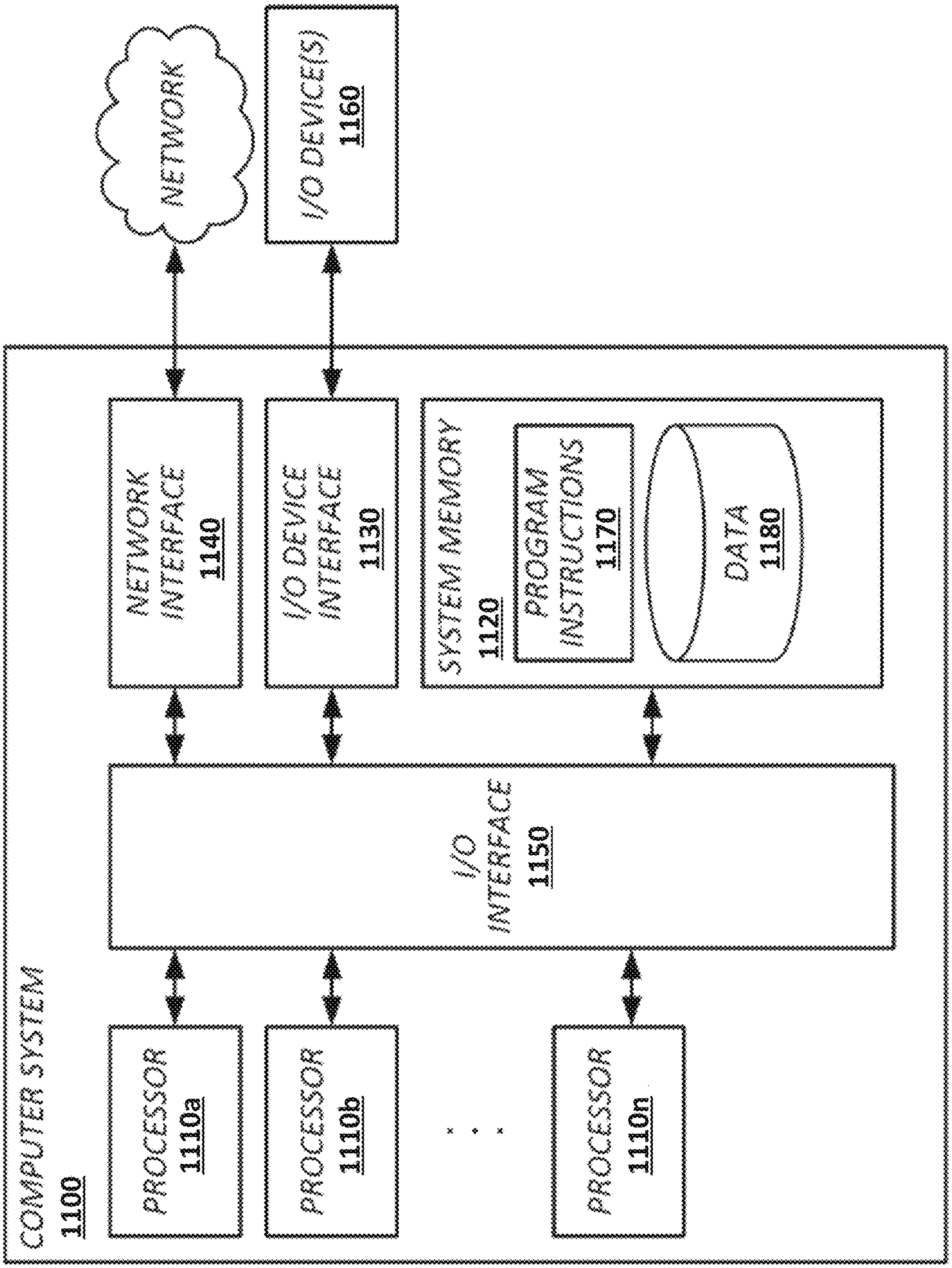
FIG. 6 is a system diagram that illustrates an example computing system that may be used as a component of systems implementing techniques described herein, in accordance with one or more embodiments.

FIG. 6 is a system diagram that illustrates an example computing system that may be used as a component of systems implementing techniques described herein. Various portions of systems and methods described herein may include or be executed on one or more computing systems similar to computing system 1100. Further, processes and modules described herein may be executed by one or more processing systems similar to that of computing system 1100.

Computing system 1100 may include one or more processors (e.g., processors 1110*a*-1110*n*) coupled to system memory 1120, and an I/O device interface 1130 via an input/output (I/O) interface 1150. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1100. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1120). Computing system 1100 may be a uni-processor system including one processor (e.g., processor 1110*a*-1110*n*), or a multi-processor system including any number of suitable processors (e.g., 1110*a*-1110*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1100 may include a plurality of computing devices (e.g., distributed computing systems) to implement various processing functions.

The I/O device interface 1130 may comprise one or more I/O device interface, for example to provide an interface for connection of one or more I/O devices 1160 to computing system 1100. The I/O device interface 1130 may include devices that receive input (e.g., from a user) or output information (e.g., to a user). The I/O device interface 1130 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. The I/O device interface 1130 may be connected to computing system 1100 through a wired or wireless connection. The I/O device interface 1130 may be connected to computing system 1100 from a remote location. The I/O device interface 1130 may be in communication with one or more other computing systems. Other computing units, such as located on remote computer system, for example, may be connected to computing system 1100 via a network, such as via a network interface 1140. The I/O device interface 1130 may be a user interface. The I/O device interface 1130 may connect multiple computer systems.

System memory 1120 may be configured to store program instructions 1170 or data 1180. Program instructions 1170 may be executable by a processor (e.g., one or more of processors 1110*a*-1110*n*) to implement one or more embodiments of the present techniques. Program instructions 1170 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1120 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1120 may include a non-transitory computer readable storage medium that may have program instructions stored thereon that are executable by a computer processor (e.g., one or more of processors 1110*a*-1110*n*) to cause the subject matter and the functional operations described herein. A memory (e.g., system memory 1120) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1150 may be configured to coordinate I/O traffic between processors 1110*a*-1110*n*, system memory 1120, I/O device interface 1130, network interface 1140, etc. I/O interface 1150 may perform protocol, timing, or other data transformations to convert data signals from one component (e.g., system memory 1120) into a format suitable for use by another component (e.g., processors 1110*a*-1110*n*). I/O interface 1150 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1100 or multiple computing systems 1100 configured to host different portions or instances of embodiments. Multiple computing systems 1100 may provide for parallel or sequential processing/execution of one or more portions of the techniques described herein.

Those skilled in the art will appreciate that computing system 1100 is merely illustrative and is not intended to limit the scope of the techniques described herein. Computing system 1100 may include any combination of devices or software that may perform or otherwise provide for the performance of the techniques described herein. For example, computing system 1100 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1100 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1100 may be transmitted to computing system 1100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

While various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system may be transmitted to computer system via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art of reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A method for determining differences in performance for a federated learning model for users of different demographic groups, comprising:

obtaining, with a computer system, for a set of users of the federated learning model, demographic group membership values and performance values,
  wherein the set of users comprises users with at least two different demographic group membership values, and
  wherein the performance values comprise measures of performance for the federated learning model applied to a subset of a user's data,
  wherein the federated learning model comprises a cross-device federated learning model,
    wherein parameters of local models are trained using corresponding local users' data, and
    wherein parameters of the cross-device federated learning model comprise aggregates of the parameters of the local models;
applying, with the computer system, a first perturbation to the demographic group membership values of a first subset of the set of users, the first subset selected from the set of users;
applying, with the computer system, a second perturbation to the performance values for the first subset of the set of users,
  wherein the second perturbation is determined based on the applied first perturbation; and
determining, based on the perturbed demographic membership values and perturbed performance values, mean performance values of the federated learning model for one or more demographic groups.

2. The method of claim 1, wherein the performance values comprise, for each user, a measure of a difference between output of the local model and output of the cross-device federated learning model for the subset of the user's data.

3. The method of claim 1, wherein the performance values are measured by the users.

4. The method of claim 1, wherein applying the first perturbation to the demographic group membership values comprises perturbing, for the first subset of users, corresponding demographic group membership values to generate perturbed group membership values.

5. The method of claim 4, wherein applying the first perturbation maintains, for a given user, the group membership value with a probability a and changes the group membership value with a probability 1-a.

6. The method of claim 4, wherein the first perturbation is a randomized response perturbation.

7. The method of claim 1, wherein applying the second perturbation comprises:

applying a third perturbation to perturb performance values for a first portion of users of the first subset of users, the first portion of users comprising users whose demographic group membership value is changed by the first perturbation.

8. The method of claim 7, wherein the third perturbation maintains an expectation value for the performance values of the first portion of users.

9. The method of claim 7, wherein applying the second perturbation comprises:

applying a fourth perturbation to performance values for a second portion of users the first subset, the second portion of users comprising users whose demographic group membership value is maintained by the first perturbation.

10. The method of claim 1, wherein applying the second perturbation comprises applying a discretization or a randomized response perturbation.

11. The method of claim 1, wherein applying the second perturbation comprises applying a Laplacian perturbation.

12. The method of claim 7, wherein the third perturbation generates an expectation value of zero for perturbed performance values.

13. The method of claim 9, wherein the fourth perturbation maintains an expectation value for the performance values of the second portions of the users.

14. The method of claim 13, wherein the fourth perturbation randomizes the performance values while maintaining the expectation value for the performance values.

15. The method of claim 1, wherein the demographic group membership values are self-reported.

16. The method of claim 1, wherein the demographic group membership values and the performance values are transmitted to the computer system by the users, wherein the computer system comprises an aggregator, and wherein the aggregator guarantees privacy to the users in order to encourage reporting of the demographic group membership values and the performance values.

17. The method of claim 16, wherein the privacy guarantee is a local differential privacy guarantee.

18. The method of claim 16, wherein the privacy guarantee is enforced by General Data Protection Regulation (GDPR).

19. The method of claim 7, wherein the third perturbation sets the performance value to zero for the first portion of users.

20. The method of claim 9, wherein the fourth perturbation maintains the performance values for the second portion of users.

21. The method of claim 1, further comprising determining a measure of model unfairness based on a difference in mean performance values for two or more demographic groups.

22. The method of claim 1, wherein determining the mean performance values comprises determining the mean performance values of the federated learning model for the one or more demographic groups while protecting privacy of individual users.

23. A method for determining differences in performance for a federated learning model for users of different demographic groups, comprising:

obtaining, with a computer system, for a user of the federated learning model a demographic group membership value and performance values, wherein the performance value comprises a measure of performance for the federated learning model applied to a subset of the user's data, wherein the federated learning model comprises a cross-device federated learning model, wherein parameters of a local model are trained using the user's data, and wherein the parameters of the cross-device federated learning model comprises aggregates of parameters of a plurality of local models trained using corresponding users' data;

applying, with the computer system, a first perturbation to the demographic group membership values of the user;

applying, with the computer system, a second perturbation to the performance value of the user, wherein the second perturbation is determined based on the applied first perturbation; and outputting, with the computer system, the perturbed data values and perturbed group membership values of the user to an aggregator for determination of mean performance values of the federated learning model for one or more demographic groups.

24. The method of claim 23, wherein applying the first perturbation comprises generating a perturbed demographic group membership value which is different than the group membership value for the user with a probability 1-a and maintaining the demographic group membership value with a probability a.

* * * * *